United States Patent [19]

Burger

[11] Patent Number: 4,745,618
[45] Date of Patent: May 17, 1988

[54] OPTICALLY STABLE RESONATOR FOR PRODUCING A LASER BEAM

[75] Inventor: Dieter Burger, Vaihingen, Fed. Rep. of Germany

[73] Assignee: Daimler-Benz Aktiengesellschaft, Stuttgart, Fed. Rep. of Germany

[21] Appl. No.: 13,260

[22] Filed: Feb. 11, 1987

[30] Foreign Application Priority Data

Feb. 11, 1986 [DE] Fed. Rep. of Germany ....... 3604231

[51] Int. Cl.$^4$ ................................................ H01S 3/08
[52] U.S. Cl. ...................................... 372/101; 372/92; 372/93
[58] Field of Search ...................... 372/98, 93, 97, 101, 372/92, 99

[56] References Cited

U.S. PATENT DOCUMENTS

| | | | |
|---|---|---|---|
| 3,522,553 | 8/1970 | Fox | 372/101 |
| 3,609,585 | 9/1971 | Hufnagel | 331/94.5 |
| 3,868,590 | 2/1975 | Itzkan et al. | 331/94.5 |
| 4,423,511 | 12/1983 | Morton | 372/95 |
| 4,551,684 | 11/1985 | Bernhardt | 372/93 |
| 4,554,666 | 11/1985 | Altman | 372/97 |
| 4,696,012 | 9/1987 | Harshaw | 372/99 |

FOREIGN PATENT DOCUMENTS

| | | |
|---|---|---|
| 1439402 | 4/1973 | Fed. Rep. of Germany . |
| 1514508 | 10/1975 | Fed. Rep. of Germany . |
| 144993 | 11/1980 | Fed. Rep. of Germany . |
| 426038 | 6/1967 | Switzerland . |
| 1507188 | 4/1978 | United Kingdom . |

Primary Examiner—James W. Davie
Assistant Examiner—Xuan Vo
Attorney, Agent, or Firm—Barnes & Thornburg

[57] ABSTRACT

An optically stable resonator producing a laser beam which by the use of a converging and of a diverging optical element is subdivided into an amplifier part with large beam diameter and small energy density and into a mode filter part with small beam cross section and correspondingly small Fresnel number all with a short structural length of the resonator. The advantage of the present invention resides in the high beam quality of the produced beam which contains predominantly only the fundamental mode, and in the small thermal load of the participating elements, especially of the decoupling window. The subdivision of the stable resonator according to this invention into an amplifier part and into a load filter part opens up to this resonator type power output ranges which were precluded heretofore by reason of a maximum permissive thermal load of the decoupling window.

18 Claims, 3 Drawing Sheets

OPTICALLY STABLE RESONATOR FOR PRODUCING A LASER BEAM

BACKGROUND AND SUMMARY OF THE INVENTION

The present invention relates to an optically stable resonator for producing a laser beam, as is generally known, for example, from the high energy laser technology for metal machining. In that connection, the published articles from the publication "Applied Optics", 1966, pages 1550-1567 or from the publication "Lasers & Applications", 1985, pages 79-83 should be mentioned as literature of interest. The criterion for differentiation of so-called stable and unstable resonators for producing laser beams is also indicated in this literature.

Most of the so-called unstable resonators operate exclusively with reflective optical elements in the resonator which can be thermally loaded more highly than transmissive optical elements because, on the one hand, the reflection losses are smaller than the adsorption losses of transmissive elements and because, on the other, reflective optical elements can be cooled intensively. In particular, the unstable resonators require no transmissively loaded decoupling window as include the so-called stable resonators because with such unstable resonators the beam can be guided out of the resonator through a bore which, by reason of an appropriate arrangement of transversely directed aerodynamic flows is able to maintain the vacuum prevailing on the inside of the resonator with respect to the outside. Power output ranges of above 1.5 kw can be realized without difficulty in the exiting laser beam, however, the beam quality, i.e., the energy distribution over the beam cross section is by no means homogeneous and is also not constant with respect to time at every place. Particularly disadvantageous with the beam of an unstable resonator is the fact that it has a hollow cylindrical shape, i.e., its energy maximum is not located in the beam center but is distributed circularly shaped along the edge. As a result thereof, the working beam of an unstable resonator cannot be optimally finely focused so that by reason of laws applying to optical waves, a certain limit results for the energy density in a focused laser beam.

A better beam quality, namely, a laser beam with a so-called Gauss energy distribution over the beam cross section is quite realizable with a resonator operating in a stable manner for the laser beam production, which can be focused particularly narrowly. Also, a better constancy of the energy profile of such a laser beam with respect to time can be obtained with a resonator operating in a stable manner. However, the high thermal loads of the decoupling window through which the laser beam must pass, is disadvantageous with this type of resonator. At most, power outputs of the order of magnitude of about 1.5 kw are achievable in the working beam with the hitherto known resonator types of construction of stably operating resonators with acceptance of few higher modes. With a view to the aimed-at Gauss energy distribution inside of the produced laser beam, a Fresnel number of 1 is aimed at for the resonator. Reference is made to the aforementioned literature for the significance of this number and for the determination thereof. A very small Fresnel number of the magnitude near 1 requires, however, a very large structural resonator length. Though the outside shape of the resonator itself ca be kept relatively small by a space-saving folded arrangement of the beam path, the optically effective length of the beam path is very large, and it is difficult to adjust the same in a stable and positionally accurate manner which is particularly important for a high power output yield. The smallest thermal changes inside of the resonator may lead to a misadjustment of the mirrors which can have as a consequence higher losses and a burning-through of the optical elements. In that regard—as mentioned already—in particular the decoupling window is endangered because it cannot be cooled intensively as, for example, a mirror. An enlargement of the decoupling window for reducing the energy density also produces little help because with an increasing size of the decoupling window, respectively, of the beam diameter, the Fresnel number becomes larger, and the beam quality decreases rapidly; i.e., with increasing size of the beam diameter, higher modes occur with otherwise the same conditions which one precisely seeks to avoid. By reason of the presence of higher modes in the exiting laser beam, the beam can be focused less well and thus the high energy density required for a good operating result can no longer be obtained.

It is the object of the present invention to provide a stable resonator of the aforementioned type in such a manner that notwithstanding a high overall energy of the exiting light beam, for example, above 1 kw, the energy density at the decoupling window reaches only values which can be controlled without difficulty and that nonetheless an energy distribution in the exiting light beam can be realized at least approximating the Gauss energy distribution.

The underlying problems are solved according to the present invention in that at least one separate optical element is arranged in the resonator which converges the light beam proceeding in the direction toward the end mirror in such a manner that the beam impinging on the end mirror is considerably smaller in diameter than the diameter of the light beam passing through the decoupling window and in that at least one further optical element is arranged in the resonator or functionally integrated with the end mirror which diverges the light beam passing in the direction to the decoupling window corresponding to the extent of the convergence of the oppositely directed light beam. Owing to the converging and the diverging optical element in the resonator, a dual division of the resonator into an amplifier part and into a mode filter part is undertaken. This permits to design the amplifier part to high Fresnel numbers which enables a reduction of the energy density at the decoupling window even though the overall emerging light power is very high. The mode filter part can be designed to a small Fresnel number within the range of 1 which, owing to the small beam cross section, requires only small resonator structural lengths that can be readily controlled. More particularly, the structural length of the resonator is reduced owing to the reduced beam cross section in the mode filter part. With a reduction of the beam diameter to half its size, the beam length in the mode filter part is reduced to only one-quarter with the same Fresnel number.

These and other objects, features, and advantages of the present invention will become more apparent from the following description when taken in connection with the accompanying drawing which shows, for purposes of illustration only, several embodiments in accordance with the present invention.

DETAILED DESCRIPTION OF THE DRAWINGS

Even though the resonators illustrated in the various embodiments represent so-called gas lasers, in which the laser-active medium is a gas, the present invention is also realizable without difficulty with solid-body lasers or liquid lasers. Of course, it is immaterial for the present invention whether the gas lasers are traversed by the flow longitudinally or transversely or which is the type of the excitation of the laser-active medium, for example, by high voltage, by high frequency or by light. The reduction of the energy density in the amplifier part of the resonator according to the present invention is of advantage in particular also for solid body lasers so that for this type of resonators a new power output field can be opened up by the present invention. On the other hand, the present invention is not limited to high-power lasers, but can also be applied advantageously to other laser light sources in which high beam quality is of importance, i.e., in which, to the extent possible, only the fundamental mode is to be contained in the useful beam.

Figure 1:
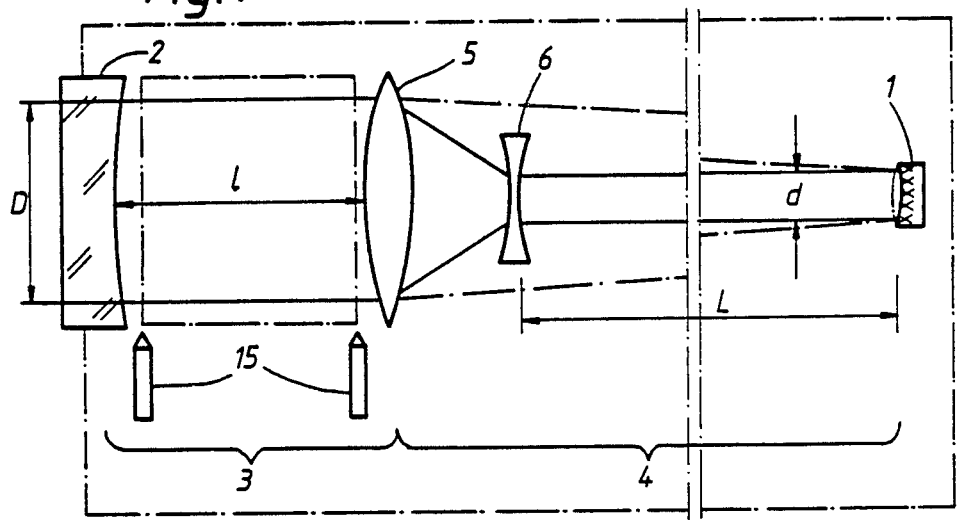
FIG. 1 is a schematic view illustrating in principle a resonator with subdivision into an amplifier and into a mode filter part with the use of transmissive optical elements and rectilinear beam path in accordance with the present invention.

Referring now to the drawing wherein like reference numerals are used throughout the various views to designate corresponding parts, the strongly schematic resonator illustration according to FIG. 1 permits a particularly clear understanding of the principle according to the present invention. The resonator illustrated in FIG. 1 includes a relatively small fully reflecting end mirror 1 at its rear end, whose reflecting surface is illustrated curved in an exaggerated manner. As a result of this very slight mirror curvature, a beam divergence, which is conditioned on the wave nature of the light, is to be counteracted. At the opposite end of the resonator, where the produced useful beam leaves, the so-called decoupling window 2 is provided which is constructed as a partially reflecting mirror. Within an area located closest to the decoupling window 2, the amplifier part 3 is provided inside of the resonator in which a laser-active medium, for example, carbon dioxide gas is contained and which is adapted to be supplied with excitation energy by a pair of high voltage electrodes 15. The gas is partially ionized by the applied high voltage, and the molecules thereof are transferred into an excitation condition so that light amplification takes place by stimulated emission. A converging lens 5 and a diverging lens 6 are provided following the amplifier space of the amplifier part 3 indicated in dash and dotted lines, by means of which the light beam which exists inside of the amplifier part with the diameter D, is reduced to a considerably narrower light beam with the diameter d and a correspondingly higher energy density. The beam reduced in cross section is conducted to the end mirror 1 and back to the amplifier part 3 whereby it is again enlarged by the two lenses 6 and 5 to the larger diameter present in the amplifier part 3. The mode filter action of the filter part 4 of the resonator is created by a correspondingly slender configuration of the beam existing in this resonator part. Owing to the relatively small beam cross section, also small Fresnel numbers can be realized also with acceptable beam length; the smaller the Fresnel number, the larger is the filter action for higher beam modes. With a Fresnel number of about 1, only the fundamental mode $TEM_{00}$ is still present in the laser light beam. With a Fresnel number of 1, the area formed by the wavelength and the beam length L of the mode filter part is as large as a square with the length of its side equal to half the beam diameter. With a $CO_2$ laser having a light wavelength of 10.6 $\mu$m and a beam diameter d inside of the mode filter part of 5 mm., this means a beam length L of about 60 cm. for achieving a Fresnel number of 1. The energy density is very high in this relatively narrowly focused beam; however, it is tolerable at least by the end mirror 1 because the latter can be cooled effectively with cooling water from the back side thereof. Only the transmissive optical element 6; namely, the diverging lens, cannot be cooled so effectively so that by reason of this lens, the resonator according to FIG. 1 will be limited to relatively small power outputs. However, the convergingly effective lens 5 is loaded only with a relatively small energy density by reason of the large beam diameter, and more particularly with such an energy density as can also be demanded of the exit window. These energy densities are—as is assumed here—tolerable without difficulties by other transmissive optical elements.

A modified embodiment of the resonator is indicated in FIG. 1 in dash and dotted lines; more particularly, the divergent effect of the lens 6 is integrated into a corresponding convex configuration of the end mirror 1. As a result thereof, the dispersing lens 6 which is highly loaded by the energy density, can be dispensed with. Of course, the convergingly effective lens 5 must additionally be constructed with a long focal distance so that a relatively narrow beam cone results. A mode filter effect is attainaable also with a mode filter part having such a conical beam passage and a small Fresnel number is realizable therewith. With a Fresnel number of 1, one-fourth of the rectangle having the lengths of the sides D×d is to be equated with such a beam passage with the rectangle from light wavelength and beam length in the mode filter part. With a beam diameter at the end mirror 1 of 5 mm., with a light wavelength of 10.6 $\mu$m and with a diameter ratio of the cone-shaped beam in the mode filter part of 1:5, the mode filter part must have a length of about 2.95 m in order to be able to realize with it a Fresnel number of 1. This is a structural length which is still quite controllable and insensitive to adjustment. However, with a diameter ratio of 1:5 at the small and at the large diameter of the light beam, the energy density in the amplifier part of the resonator is reduced to 1/25th or to 4% of that energy which exists at the end mirror 1.

In contrast to the relatively long mode filter part 4—in comparison to the customary resonators, this mode filter part is still very short—the amplifier part 3 of the resonator is relatively compact because owing to the large diameter D of the amplifier part, a large volume of laser-active medium can be accommodated therein which is responsible for the power output of the produced laser beam. The larger the diameter, the larger the producible power output with a given length $l_a$ of the amplifier space or—with predetermined power output—the specific beam load of the transmissive optical elements in the amplifier part decreases with increasing diameter. It should also be noted at this point for the sake of completeness that the specific beam load of the lens 5 is higher than that of the decoupling window 2 because only a fraction of that light energy emerges through the decoupling window in comparison to the power level of the light which is reflected to and fro within the resonator and which passes through the lens 5. Corresponding to the reflection degree of the partially reflecting mirror, which the decoupling window represents, the specific beam load of the lens 5 is therefore higher. With a reflection degree of 75% in the decoupling window 2, the specific load at the lens 5, by reason of the beam through-passage, is four times as high as at the decoupling window because with a 25% permeability or transparency, energy is decoupled at the ratio of 1:4.

Figure 2:
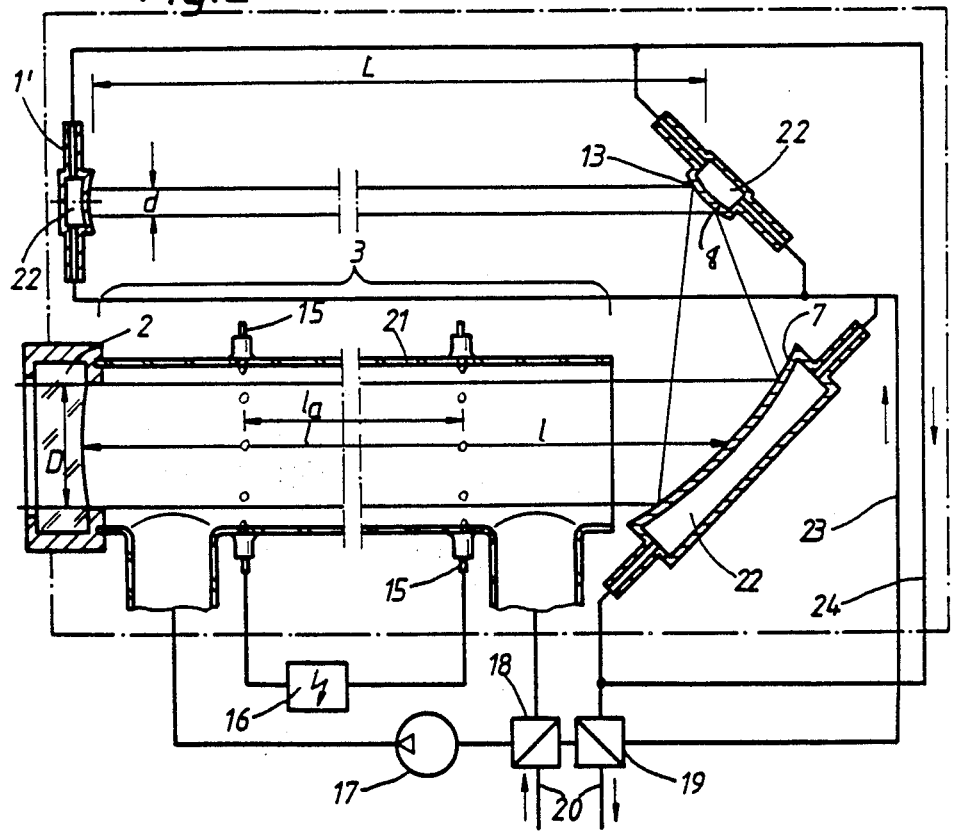
FIG. 2 is a somewhat schematic view of a resonator according to the present invention with the use of reflective optical elements in beam tapering and with the use of a bent beam course.

Though the resonator illustration according to FIG. 2 is still quite schematic, it indicates a few more details than the illustration according to FIG. 1. Above all, in the embodiment of FIG. 2—apart from the decoupling window 2—only reflectively operating optical elements are provided inside of the resonator which can be thermally loaded highly owing to an intensive cooling possibility.

The amplifier part 3 of this resonator essentially consists of an amplifier pipe or tube 21 which is closed off against the outside by the decoupling window 2; within the beginning and the end of the tube, a rim of electrodes 15 is provided along the tube circumference which are connected to a high voltage source 16. Connections are provided at the amplifier tube outside of the electrodes, by way of which the laser-active medium, for example, carbon dioxide gas, can be pumped through the length of the amplifier tube by means of the circulating pump 17 and can be fed through a heat-exchanger 18. The heat due to energy losses, which was absorbed in the amplifier tube, can be conducted away thereat toward the outside by way of external cooling water supply and discharge lines 20. For the sake of completeness, it should be mentioned that still further means for evacuating the circulatory system and the entire resonator and for feeding carbon dioxide are provided as peripheral apparatus which, however, is not illustrated.

The mode filter part of the resonator begins with a converging mirror 7 provided at the end of the amplifier tube 21, which is constructed as parabolic mirror and deflects the beam through 90° with respect to the axis of the amplifier tube. Of course, the mirror 7 is of such dimensions that it encompasses the entire cross-sectional area (diameter D) of the light beam present in the amplifier part of the resonator. By reason of the relatively large beam dimension, the energy load of this mirror is relatively small; nonetheless, it is constructed as mirror adapted to be cooled with water and having a cooling water chamber 22 provided at its back side. The converging beam is directed toward a further divergingly effective mirror 8 which converts the conical light beam into a parallel light beam with the diameter d and at the same time deflects the same parallel to the amplifier tube 21. By reason of the small beam diameter, the specific beam load of this mirror is high, whence this mirror must necessarily be cooled intensively with water and is also provided with a water-cooling space 22. Also the second divergingly effective mirror 8 is constructed as parabolic mirror, however, with a convex mirror surface. This parabolic mirror is also so arranged that the parallel position with respect to the amplifier tube 21 of the last beam part is attained. The end mirror 1' is also thermally highly loaded and is constructed as coolable mirror with a water-cooling space 22. The cooling spaces 22 of the mirrors are connected with a cooling water circulation having a cooling water inlet 23 and cooling water return 24 as well as a heat-exchanger 19 which is also connected on the side of the heat emission to the cooling water inlet and discharge 20. The heat due to energy losses of the mirrors is conducted toward the outside by way of the heat-exchanger 19.

In the illustration according to FIG. 2, the end mirror 1' is represented as concave mirror which, however, is also indicated in an exaggerated manner; only the possibility of influencing the beam enlargement conditioned on the nature of the waves is to be indicated therewith—as in conjunction with the end mirror 1 of the embodiment of FIG. 1.

For the mode filter action of the mode filter part of the resonator according to FIG. 2, in addition to the diameter d of the light beam in the last part of the mode filter, above all the beam length L, i.e., the distance of the diverging mirror 8 from the end mirror 1' is determinative. Considering these magnitudes, a Fresnel number near 1 and under 1.5 is aimed at for the mode filter part. In contrast, a higher Fresnel number above 10 is aimed at for the beam portion limited to the amplifier part 3 in order to obtain a smaller energy density during the passage of the beam through the decoupling window 2 and in order to be able to accommodate a high active volume in the resonator. In the design for a predetermined Fresnel number, in addition to the beam diameter D, above all the distance of the reflecting surfaces of the decoupling window 2 from the convergingly effective mirror 7, i.e., the distance L is determinative.

Hereinafter, an estimation of the thermal loads of the individual optical elements and a magnitude estimate of hitherto critical structural dimensions of the resonator will be made hereinafter by reference to a numerical example. At first, some assumptions are to be made: the output power of the resonator is to amount to 5 kW with a decoupling degree of 50; additionally, it is to be assumed that the beam diameter in the last part of the mode filter part of the resonator amounts to 10 mm. and that the beam diameter in the amplifier part of the resonator amounts to 50 mm. On the basis of these assumed numerical values, a beam length of 2.5 m. will result for the mode filter part if designed for a Fresnel number of 1. The average beam power in the interior of the resonator amounts to 10 kW under the taken assumption which means a specific beam load of about 125 watts per mm$^2$ mirror area of the end mirror, respectively, of the diverging mirror; these load values are quite acceptable with liquid-cooled mirrors. With an absorption loss of maximally 0.5% at the mirrors, a loss of power of 50 watts per mirror must be conducted away at each mirror which is quite possible without difficulty also with small mirrors.

Figure 4:
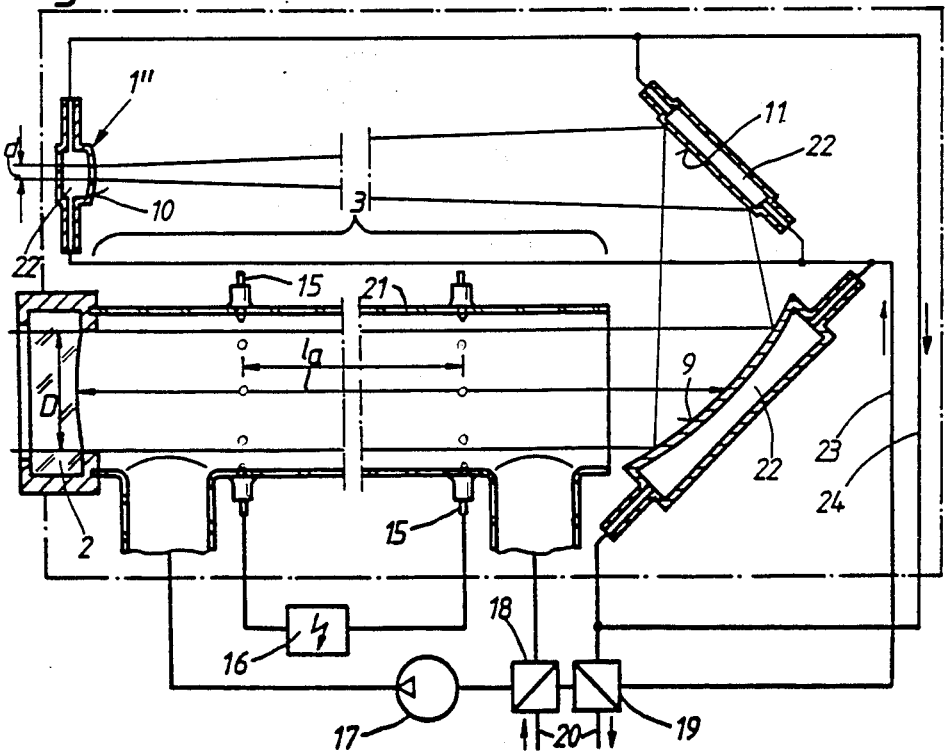
FIG. 4 is a schematic view of another modified embodiment of a resonator in accordance with the present invention in which the diverging optical element is functionally integrated with the end mirror of the resonator and in which a conical course of the beam is present in the mode filter part.

A certain modification of the resonator according to FIG. 2 is illustrated in FIG. 4. More particularly, in the resonator illustrated therein, the function of the diverging mirror is built into the end mirror 1" which has a convex mirror surface. The deflection mirror 11 is constructed as plane mirror which has only the function to deflect the conical light beam bundle from the converging mirror 9 with a relatively long focal length parallel in the direction toward the end mirror 1". For the Fresnel number calculation of the mode filter part of this resonator, the product of half the smallest beam diameter d and half the large beam diameter D must be substituted into the corresponding equation. A larger length will result in the mode filter part from the conical construction of the beam in order to be able to reach a Fresnel number, for example, of 1, however, only a single mirror; namely, the end mirror 1" is present in the resonator which is thermally loaded very highly. Additionally, the interposition of a deflection mirror 11 offers the advantage that the latter can be utilized for the correction of an astigmatism. More particularly, differing from the expensive parabolic configuration of the mirrors 9 and 1", the latter can be constructed also as spherical mirrors; the astigmatism, which will occur thereby, can then be corrected by a cylindrical configuration of the deflection mirror 11. Spherical mirrors can be obtained at present considerably more inexpensively than parabolic mirrors.

Figure 3:
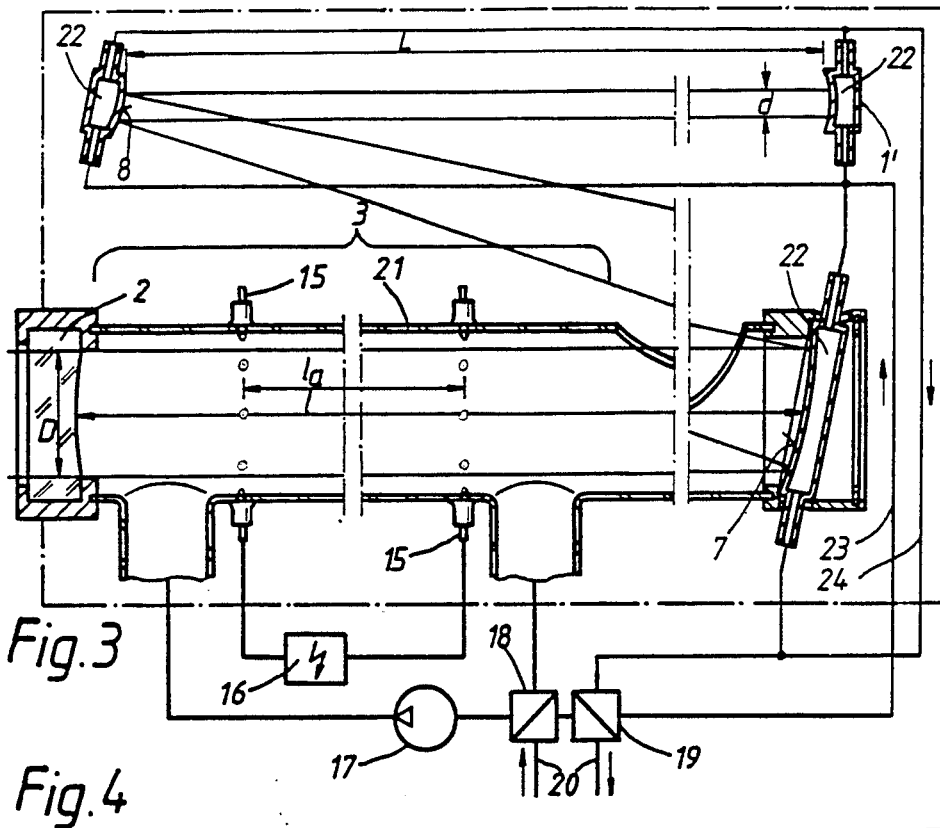
FIG. 3 is a schematic view of a modified embodiment of a resonator according to FIG. 2, in which smaller deflection angles at the optical elements changing the cross section can be realized.

The embodiment of the resonator according to FIG. 3 utilizes—as the embodiment according to FIG. 2—parabolically constructed mirrors 7 and 8 which are also adapted to be water-cooled. The significant difference of the embodiment according to FIG. 3, compared to the embodiments already described, resides in that the deflection angle at the mirrors 7 and 8 is smaller than 90° which can be realized with lesser set-up and adjusting difficulties and with lesser quality loss than with a deflection of 90°. It is significant thereby that the divergingly effective mirror 8 is located from the converging mirror 7 exactly as far as the end mirror 1' from the divergingly effective mirrors 8. This relatively large length of the conical beam part benefits also the mode filter part of the resonator; more particularly, the mode filter action of this conical beam is smaller by the factor of the diameter ratio of the beams at the large and at the small end of the conical beam part compared to that type of mode filter action which is obtained within the area of the parallel beam. With a diameter ratio of 1:5, the mode filter action in the conical beam part is therefore approximately only 20% of the mode filter action in the parallel beam passage.

Figure 5:
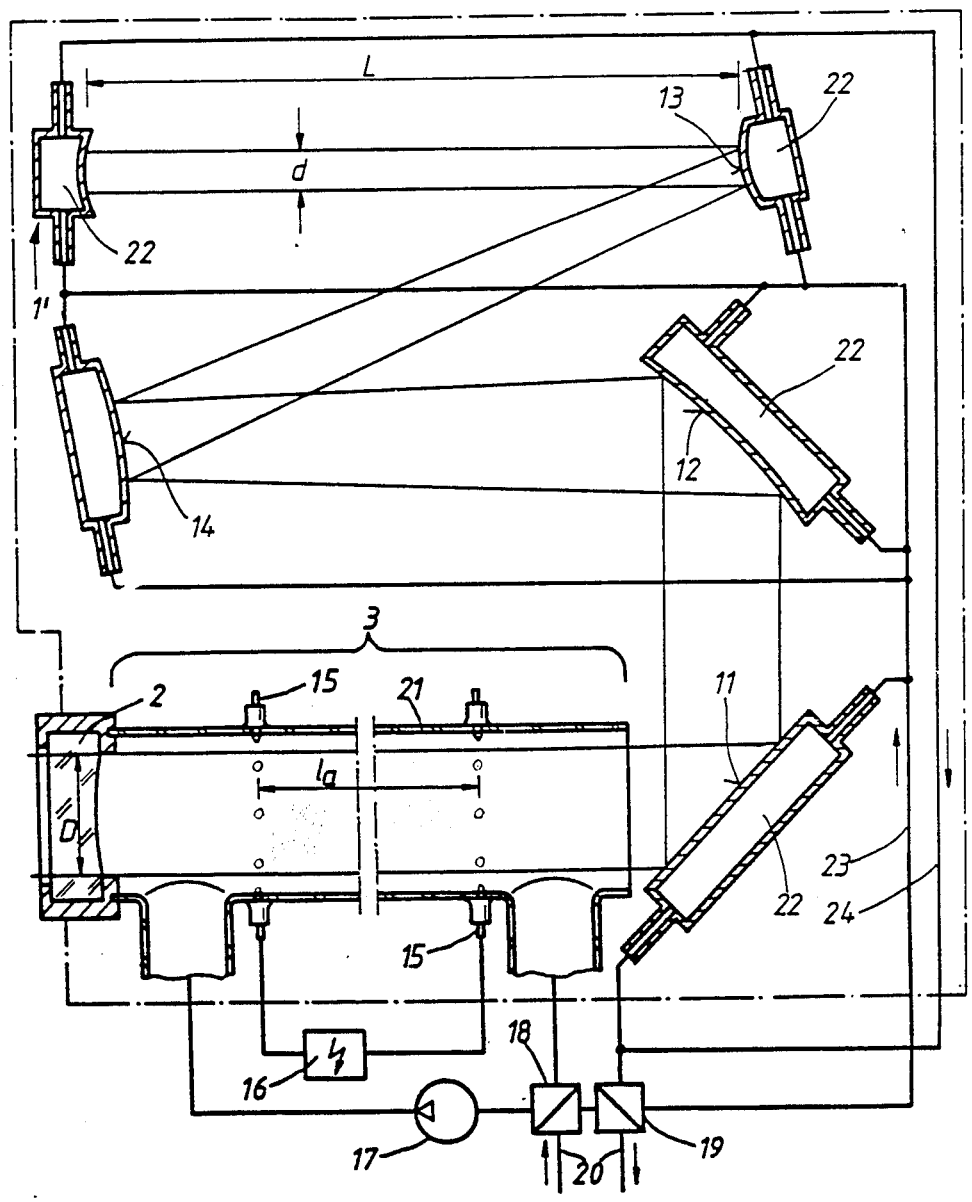
FIG. 5 is a schematic view of a still further modified embodiment of a resonator according to this invention with the use of spherically constructed mirrors changing the beam cross section and with the interposition of a cylindrically shaped mirror for correcting an astigmatism.

A further modification of the mode filter part of the resonator is illustrated in FIG. 5. More particularly, the possibility of correcting an astigmatism by means of a cylinder mirror is mentioned which has already been indicated in conjunction with the embodiment according to FIG. 4. A plane deflection mirror 11 is provided at the end of the amplifier part 3, respectively, of the amplifier tube 21 which deflects the relatively large-area beam passing from the amplifier part into the mode filter part toward the convergingly acting mirror 12 with spherically shaped mirror surface.

From there, the beam is deflected approximately parallel to the amplifier tube 21 in the direction toward the cylinder mirror 14 which is so adjusted that the astigmatism occurring with the deflection at the spherical mirror 12 can again be corrected. The cylinder mirror 14 further deflects the light beam in the direction toward the divergingly effective mirror 13, on which the conical light beam impinges with a diameter d. The light beam is finally conducted by this mirror 13 toward the end mirror 1' parallel light beam with a course approximately parallel to the amplifier tube 21. The diverging mirror 13 is also constructed as spherical mirror; the astigmatism occurring as a result thereof can also be corrected by the cylinder mirror 14. The expenditure in the mode filter part of the resonator illustrated in FIG. 5 with altogether five mirrors is relatively large; however, this expenditure appears acceptable by reason of the possibility of using the less expensive and accurately manufacturable spherical mirrors.

Owing to the subdivision of the resonator into amplifier part with relatively small energy density and large beam diameter, on the one hand, and into mode filter part with small beam diameter and small Fresnel number achievable thereby with short structural length, on the other, a power range is opened up for the resonators operating in a stable manner which heretofore has eluded this resonator type by reason of the high thermal loads of the decoupling window. Known stably operating resonators could be operated up to, respectively, designed heretofore for maximally approximately 1.5 kw with good beam quality; with higher outputs, either the thermal load of the decoupling window became too high or higher modes occurred in the produced laser beam with the consequence that the beam could not be focused as narrowly as a qualitatively high-value laser beam which contains principally only the fundamental mode with Gauss energy distribution.

One aims at being able to focus the emerging light beam onto a smallest possible point and to concentrate the output energy onto a smallest possible point. The smaller this point, the better is the operating result during welding or during cutting. Though a narrower focusing is possible with objectives having short focal distances than with objective having long focal distances, one nonetheless aims at undertaking the focusing with an objective having as long a focal distance as possible because in actual work use of the laser beam, metal splatters may splash back from the focusing point in the direction toward the objective and may damage the latter. The longer the focal distance of the objective, the further it can be spaced from the operating point, respectively, the focal distance point and the less likely it is that metal splatters will reach the objective.

Owing to the construction of the stable resonator in accordance with the present invention, not only high value beams can be produced that still contain only the fundamental mode and which can be well focused, but additionally—as mentioned—also beam power outputs can be reached which were not attainable with the mentioned beam quality. Even with the use of objectives having long focal distances, with which quite normally only a limited focusing is possible, corresponding energy densities can be produced by reason of the high beam power outputs, by means of which a completely satisfactory welding result is obtainable. An indirect advantage of the present invention is not only a longer length of life of the focusing objective owing to the possibility of using objectives with long focal distances, but also a good working result by reason of the overall higher beam power. As a result thereof, workpiece cross sections can be welded together which, by reason of their size, were not accessible heretofore by means of laser welding.

While I have shown and described several embodiments in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An optically table resonator for producing a laser beam, comprising an end mirror means substantially fully reflecting the light and arranged at one end of said resonator, decoupling window means constructed as partially reflecting mirror and arranged at the other end of said resonator, an amplifier part having laser-active medium adapted to be fed with amplifying energy and being substantially coaxially traversed by light several times in opposite direction, at least one separate optical element arranged within said resonator which is operable to converge the light beam proceeding the direction toward said end mirror means in such a manner that the beam impinging on said end mirror means is considerably smaller in diameter than the diameter of the light beam exiting out of said decoupling window means, and at least one further optical means in said resonator which is operable to diverge the light beam proceeding in the direction toward said decoupling window means substantially corresponding to the extent of the convergence of the oppositely directed light beam.

2. A resonator according to claim 1, wherein said further optical means is arranged in said resonator as separate optical element.

3. A resonator according to claim 1, wherein said further optical means is functionally integrated with said end mirror means.

4. A resonator according to claim 1, wherein the convergingly effective optical element is arranged outside said amplifier part between said amplifier part and said end mirror means.

5. A resonator according to claim 1, wherein the divergingly effective optical means is constructed separately with respect to said end mirror means and is arranged optically as near as possible to the convergingly acting element and as far away as possible from the end mirror means in the beam passage intermediate the two last-mentioned elements.

6. A resonator according to claim 1, wherein said length of the amplifier part of said resonator which is measured in the beam direction and is determinative for the bending losses, and the diameter of the light beam inside said resonator are so designed that for the beam portion limited to said amplifier part, a Fresnel number greater than 1 results and in that the beam disposed between said diverging optical element or said converging optical means and said end mirror means is so designed as regards length and diameter that a lower Fresnel number will result for this beam part.

7. A resonator according to claim 6, wherein the first-mentioned Fresnel number is greater than 10.

8. A resonator according to claim 7, wherein the second-mentioned Fresnel number is less than 1.5.

9. A resonator according to claim 6, wherein the convergingly effective optical element is arranged outside said amplifier part between said amplifier part and said end mirror means.

10. A resonator according to claim 6, wherein said divergingly effective optical means is constructed separately with respect to said end mirror means and is arranged optically as near as possible to said convergingly optical element and as far away as possible from said end mirror means in the beam passage intermediate the two last-mentioned elements.

11. A resonator according to claim 1, wherein said converging optical element and said diverging optical means are constructed as coolable mirrors.

12. A resonator according to claim 1, wherein the beam path is arranged bent in a space-saving manner by way of deflection mirrors.

13. A resonator according to claim 12, wherein said deflection mirrors serving for the space-saving deflection of the beam path are constructed at the same time as converging and diverging mirror means.

14. A resonator according to claim 13, wherein the deflection angles of the converging, respectively, diverging mirror means are smaller than 90°.

15. A resonator according to claim 13, wherein said converging and diverging mirror means are constructed with spherically shaped mirror surfaces and wherein a deflection of the beam takes place between said two mirror means by means of a mirror with cylindrical mirror surface.

16. A resonator according to claim 15, wherein the deflection angles of the converging, respectively, diverging mirror means are smaller than 90°.

17. A resonator according to claim 16, wherein said converging optical element and said diverging optical means are constructed as coolable mirrors.

18. A resonator according to claim 15, wherein the length of the amplifier part of the resonator which is measured in the beam direction and is determinative for the bending losses, and the diameter of the light beam inside the resonator are so designed that for the beam portion limited to the amplifier part, a Fresnel number greater than 1 results and in that the beam disposed between the diverging optical element or the converging optical means and the end mirror means is so designed as regards length and diameter that a lower Fresnel number will result for this beam part.

* * * * *